(12) United States Patent
Södergard et al.

(10) Patent No.: US 7,795,358 B2
(45) Date of Patent: Sep. 14, 2010

(54) POLY(LACTIC ACID) STEREOCOMPLEX

(75) Inventors: Nils Dan Anders Södergard, Turku (FI); Erik Mikael Stolt, Turku (FI); Heikki Kalervo Siistonen, Turku (FI); Geoffrey A.R. Nobes, Decatur, IL (US)

(73) Assignee: Tate & Lyle Public Limited Company, London (GB)

( * ) Notice: Subject to any disclaimer, the term of this patent is extended or adjusted under 35 U.S.C. 154(b) by 0 days.

(21) Appl. No.: 12/035,773

(22) Filed: Feb. 22, 2008

(65) Prior Publication Data

US 2008/0207840 A1  Aug. 28, 2008

(30) Foreign Application Priority Data

Feb. 27, 2007  (GB) .................. 0703761.7

(51) Int. Cl.
*C08G 63/08* (2006.01)

(52) U.S. Cl. .................. 525/450; 525/419; 525/420; 264/328.1; 264/331.18

(58) Field of Classification Search .............. 525/540, 525/450, 419, 420, 451; 264/328.1, 331.18
See application file for complete search history.

(56) References Cited

U.S. PATENT DOCUMENTS

| 4,719,246 | A | | 1/1988 | Murdoch et al. ............ 521/134 |
| 4,766,182 | A | * | 8/1988 | Murdoch et al. ............ 525/413 |
| 2006/0142505 | A1 | * | 6/2006 | Umemoto et al. .......... 525/437 |
| 2009/0035585 | A1 | * | 2/2009 | Wakaki et al. .............. 428/446 |
| 2009/0318631 | A1 | * | 12/2009 | Narita et al. ................ 525/450 |

FOREIGN PATENT DOCUMENTS

| CA | 2 598 470 | 8/2006 |
| EP | 1 460 107 | 9/2004 |
| EP | 1 674 528 | 6/2006 |
| EP | 1 681 316 | 7/2006 |
| JP | 2005-187626 | 7/2005 |
| JP | 2005-325285 | 11/2005 |
| WO | WO 06/095923 | 9/2006 |

OTHER PUBLICATIONS

Odian, George; Principles of Polymerization, 2004, John Wiley & Sons, Inc., 4th Ed., Chapter 1, p. 21-22.*
Tran, T.A.; Leonardi, F.; Bourrigaud, S.; Gerard, P.; Derail, C.; Polymer Testing, 2008, 27, p. 945-950.*
Tsuji et al., *Macromolecules* 26:6918-6926 (1993).
Biela et al., *Macromolecules* 39:3710-3713 (2006).
Fukushima et al., *Polymer International* 55:626-642 (2006).
Tsuji et al., *Biomacromolecules* 5:1181-1186 (2004).
Tsuji, *Macromolecular Bioscience* 5:569-597 (2005).
Tsuji et al., *Biomacromolecules* 7:3316-3320 (2006).
Great Britain Application No. GB0703761.7 Search Report (Jun. 18, 2007).
PCT/GB2008/000642 International Search Report (Jun. 4, 2008).

* cited by examiner

*Primary Examiner*—David Wu
*Assistant Examiner*—Robert Jones, Jr.
(74) *Attorney, Agent, or Firm*—Williams, Morgan & Amerson, P.C.

(57) ABSTRACT

Poly(lactic acid) blends having a relatively high heat distortion temperature can be prepared by simple blending of PLA polymers of opposite stereoforms, followed by processing, e.g. by injection molding, under specific conditions of temperature and pressure, so as to produce a blend which, on differential scanning calorimetry, exhibits two peaks within the melting range of the stereocomplex. Moreover, by careful selection of these conditions of temperature and pressure, it is possible to use PLA polymers of significantly higher molecular weights than previously thought possible.

17 Claims, 2 Drawing Sheets

POLY(LACTIC ACID) STEREOCOMPLEX

This application claims priority from UK patent application 0703761.7, filed on Feb. 27, 2007.

The present invention relates to an improved composition comprising a stereocomplex of poly-D- and L-lactic acid.

Lactic acid polymers may be made by the polymerisation of lactic acid or of lactide, and references herein to poly(lactic acid) (abbreviated to "PLA", abbreviated to "D-PLA" or "L-PLA" for poly(D-lactic acid) or poly(L-lactic acid), respectively) includes polymers produced from both of these materials, unless the context requires otherwise.

It has been known since the late 1980's that PLA homopolymers of L-units will form complexes with corresponding homopolymers of the D-form by racemic crystallisation. These stereocomplexes have been found to exhibit different properties from those of the respective homopolymers. In the prior art, it has been found that racemic crystallisation occurs preferentially to homocrystallisation from the melt, provided that the average molecular weight does not exceed a certain critical maximum value of approximately $M_v=6\times10^4$ g/mol (Tsuji, H.; Ikada, Y. *Macromolecules* 1993, 26, 6918, Biela, T.; Duda, A.; Penezek, S. *Macromolecules* 2006, 39, 3710; Fukushima, K.; Kimura, Y. *Polym. Int.* 2006, 55, 626; Tsuji, H. *Macromol Biosci.* 2005, 5, 569; Tsuji, H.; Tezuka, Y. *Biomacromolecules* 2004, 5, 1181).

A stereoblend of D- and L-polylactide will accordingly form a stereocomplex with a melting point significantly higher than that of the homopolymers alone. This is well demonstrated by differential scanning calorimetry (DSC) which shows that the homopolymers melt separately at about 154° C. (L-PLA) and 171° C. (D-PLA), and at about 212° C. after the stereocomplex formation.

For example, EP0272902A2 discloses compositions comprising segments of poly(R-lactides) interlocked with segments of poly(S-lactides). These compositions are said to have better, i.e. higher, melting points than the individual enantiomers themselves. However, even though the melting points are higher, heat distortion temperatures are still too low for extensive practical use.

In EP1460107 A1 efforts have been made to resolve the problem of having too low a heat resistance in polylactide polymers. This patent discloses moulded articles with an increased distortion temperature consisting of melt-mixed poly(L-lactide) and poly(D-lactide), further including nucleating agents such as an aromatic organic phosphate and hydrotalcite. For example, an injection moulded sample containing 50 parts per weight poly(L-lactide), 50 parts per weight poly(D-lactide), 1 part per weight talc, 0.5 parts per weight aluminium bis[2,2'-methylenebis-(4,6-di-t-butylphenyl)-phosphate]hydroxide and 0.5 parts per weight of $Li_{1.8}Mg_{0.6}Al_4(OH)_{18}CO_3*3.6H_2O$ showed a distortion temperature of 150° C. However, when a similar injection moulded piece of a poly(L-lactide) and poly(D-lactide) 50/50-blend without the additional nucleating agents was made, a distortion temperature of only 70° C. was obtained, which is marginally higher than for a poly(L-lactide) injection moulded piece (58° C.). Thus, EP 1460107 A1 teaches us that the heat distortion temperature for polylactide polymers can be improved by careful choice of additional nucleating compounds. However, the heat resistance could not be significantly improved by blending poly(L-lactide) and poly(D-lactide) without the additional organic phosphates and hydrotalcite compounds.

JP2005325285 and JP2005325286 (according to Chemical Abstracts numbers 143:478996 and 143:478998, respectively) disclose high heat distortion temperatures for polylactide polymer films of blends containing 30-70 parts poly(L-lactic acid) and 30-70 parts poly(D-lactic acid). The disclosed methods of preparation include stretching the films more than 2-fold in one direction and heating at high temperatures while fixing the film. Although the polylactide polymers show improved heat distortion temperature, the preparation methods are only applicable in making films, and furthermore consume time and energy, which are not desirable in an industrial process.

We have now surprisingly found that the problem of too low a heat distortion temperature can be solved by simple blending of PLA polymers of opposite stereoforms, followed by injection moulding the blend under specific conditions of temperature and pressure. Moreover, by careful selection of these conditions of temperature and pressure, it is possible to use PLA polymers of significantly higher molecular weight than previously thought possible.

Thus, the present invention consists in a stereocomplex of D- and L-poly(lactic acid) which, on differential scanning calorimetry, exhibits two peaks within the melting range of the stereocomplex.

The average molecular weights $M_v$ of the D- and L-PLAs are preferably in excess of those usually thought suitable for the formation of stereocomplexes, i.e. in excess of $6\times10^4$ g/mol, more preferably at least $6.5\times10^4$ g/mol, and still more preferably at least $7\times10^4$ g/mol. There is no particular upper limit on the molecular weight, although, in practice, $M_n$ no greater than 1000 kDa is preferred, $M_n$ no greater than 200 kDa being more preferred.

The temperature range 190 to 240° C. is the range within which the peaks characteristic of the stereocomplex typically occur (peaks characteristic of the separate D- and L-polymers typically occur at lower temperatures, as noted above). Although we do not wish to be limited by any theory, it is thought that one of these peaks in the stereocomplex melting range, e.g. from 190 to 240° C., arises because of the specific processing conditions and these result in the enhanced properties, especially heat resistance, of the stereocomplexes of the present invention. This temperature range is more preferably from 200 to 240° C.

Again, without wishing to be limited by theory, it is thought that the ability of the high molecular weight polymers which may be used in the present invention to form stereocomplexes, contrary to previous teaching, is due to careful control of the temperatures and pressures during extrusion blending.

Thus, the present invention further consists in a process for producing a stereocomplex of D- and L-PLAs which comprises processing a blend of D-PLA and L-PLA, at least one and more preferably both of which preferably have an average molecular weight $M_v$ greater than $6\times10^4$ g/mol, preferably by injection moulding, under conditions of temperature and pressure such that the resulting stereocomplex exhibits two peaks within the stereocomplex melting range, e.g. from 190 to 240° C., on differential scanning calorimetry.

The invention is further illustrated by the accompanying drawings, in which.

Figure 1:
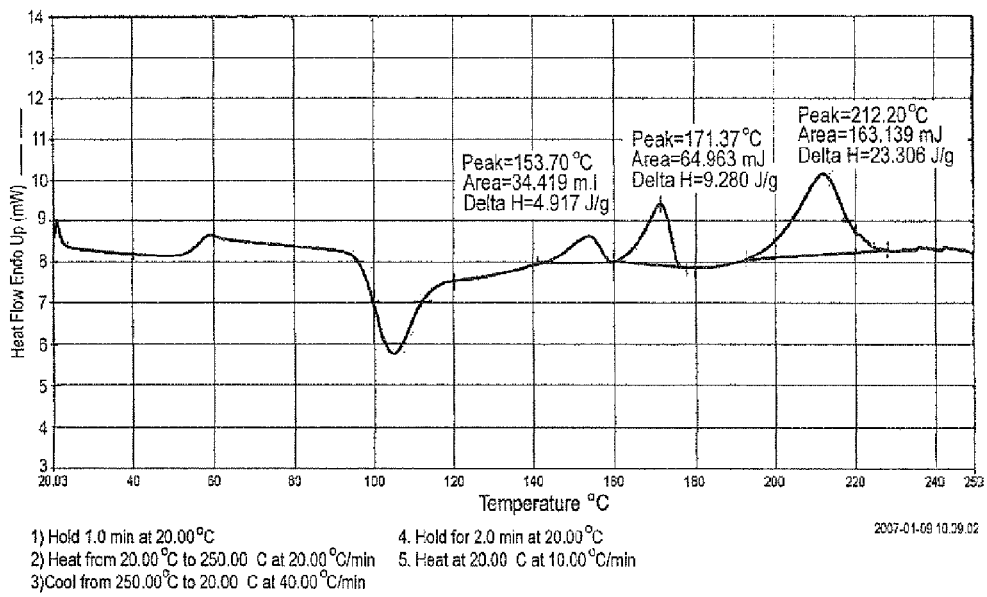
FIG. 1 shows the results of differential scanning calorimetry during the first heating cycle of a conventional stereocomplex blend of D- and L-PLA.

Although the polymers used herein are described, as is conventional, as either D- or L-, in practice, most commercial polymers will not be pure D- or pure L- but will contain regions of both configurations. Thus, when we refer herein to "D-PLA" or "L-PLA", we mean a polymer which consists predominantly of D- or L-units, as the case may be, even if they also contain a small proportion of the opposite units. Preferably, D-PLA contains at least 85% D-units and less than 15% L-units, more preferably at least 90% D-units and less than 10% L-units, and most preferably at least 95% D-units and less than 5% L-units, while L-PLA contains at least 85% L-units and less than 15% D-units, more preferably at least 90% L-units and less than 10% D-units, and most preferably at least 95% L-units and less than 5% D-units.

PLA can form linear or so-called "star-shaped" polymers, i.e. polymers composed of a plurality (more than 2) chains extending from a central section, which is usually the residue of a polyfunctional polymerisation initiator. Although, in accordance with the present invention, it is possible to use either a blend of two linear polymers or a blend of a linear polymer and a star-shaped polymer, we prefer to use a blend of at least two linear polymers.

The polymers are thought to interlock as a result of their opposite configurations. The term "interlock" as used herein means that each polymer constrains independent movement of the other polymer. In this sense, the polymers interact, but are not so tightly bound to each other that they might be considered to be cross-linked. Derivatives of the word "interlock" are to be construed accordingly.

The polymers are preferably homopolymers, but may, if desired, be copolymers of lactic acid with one or more copolymerisable monomers, provided that the homopolymer segments are sufficiently long to permit interlocking with the corresponding segments of the other polymer. In general, this may be shown by the copolymer exhibiting a crystalline melting transition characteristic of polylactide. Examples of suitable such comonomers include: lactones, such as ε-caprolactone, β-propiolactone or δ-valerolactone; and other hydroxy acids, such as glycolic acid.

The polymers may be prepared by polymerising lactic acid, lactide or a lactic acid oligomer in the presence or absence of initiator(s) and/or catalyst(s) as well as comonomers according to standard polymerisation methods known in the art, for example the ring-opening polymerisation of lactide, or polycondensation of lactic acid or of a low molecular weight oligomer produced by ring-opening polymerisation of lactide.

Each of these types of reaction is preferably carried out in the presence of an initiator. Where an initiator is used for the polycondensation reaction, this may be a polyfunctional carboxylic acid (i.e. having 2 or more carboxylic acid groups) or polyhydroxy compound (i.e. having 2 or more free hydroxy groups). Where an initiator is used for the ring-opening polymerisation reaction, this may be a polyhydroxy compound. Examples of suitable dicarboxylic acids for use as the initiator include maleic acid, succinic acid, methylsuccinic acid, glutaric acid, adipic acid, oxalic acid, malonic acid, terephthalic acid, isophthalic acid, 2,6-naphthalenedicarboxylic acid, 2,7-naphthalenedicarboxylic acid, 1,4-naphthalenedicarboxylic acid, 3,4'-diphenyl ether dicarboxylic acid, and 4,4'-diphenyl ether dicarboxylic acid. Examples of higher polycarboxylic acids which may be used as the initiator include 1,2,3,4,5,6,-cyclohexanehexacarboxylic acid, 1,2,3,4-butanetetracarboxylic acid, trimellitic acid, and pyromellitic acid. Anhydrides of these acids may also be used. Examples of suitable dihydroxy compounds include 1,4-butanediol, ethylene glycol, propylene glycol, 1,3-butanediol, and glycerol, of which 1,4-butanediol is preferred. Examples of suitable polyhydroxy compounds include trimethylolpropane, di-trimethylolpropane, pentaerythritol, dipentaerythritol, and inositol.

The polymerisation reactions may be carried out under any conditions known in the art for the polymerisation of such monomers, but is preferably carried out in the presence of a catalyst, and preferably with heating. Any catalyst known for use in such polymerisation reactions may equally be used here, and examples of suitable catalysts include such esterification catalysts as: acids, such as p-toluenesulphonic acid or sulphuric acid; metallic or organometallic compounds containing elements of groups I-VIIIA and/or groups IB-VIIB in the Periodic Table of Elements, including compounds of lithium, calcium, magnesium, manganese, zinc, lead, titanium, germanium, antimony, cobalt, or tin, especially compounds of titanium, germanium, antimony, cobalt, or tin, for example titanium (IV) butoxide or titanium acetylacetonate.

The polymerisation reaction may take place at ambient temperature, depending on the catalyst and monomers used, but is preferably carried out with heating, e.g. to a temperature of from 100° C. to 250° C., more preferably 140° C. to 210° C., and most preferably from 150° C. to 190° C.

The reaction is carried out under conditions such as to remove the water, if any, formed in the course of the reaction, i.e. at temperature of at least 100° C. and preferably under sub-atmospheric pressure, more preferably under vacuum.

The reaction is preferably carried out in the absence of any solvent other than the reagents, but, if desired, an organic solvent may be present. If used, examples of such organic solvents include: ethers, such as diphenyl ether, and dioxane; and hydrocarbons, such as toluene, xylene, and dodecane.

The reaction is preferably carried out under essentially anhydrous conditions.

The two types of PLA polymer are then melt blended. This is preferably carried out in an extruder, e.g. a Brabender DSE 25 twin-screw extruder, after which the blend is processed under conditions of temperature and pressure, and for such a time, such that the resultant blend exhibits two peaks within the stereocomplex melting range, e.g. from 190 to 240° C., on differential scanning calorimetry. This processing is most suitably carried out by injection moulding in an injection moulding machine, where it is subjected to the conditions of temperature and pressure necessary to achieve the desired properties, especially high heat distortion temperature. Using an ARBLURG-injection moulding machine (Arburg Allrounder 320C manufactured by Arburg GmbH, Lossburg, Germany), we have found that the preferred conditions are: injection pressure 1250±250 bar; after-pressure and holding-pressure 1000±200 bar; cone temperature 70±3° C.; cavity temperature: 40±5° C.; cooling time: 30±5 seconds. If the values indicated above are exceeded, the injection moulded products either are too soft to release from the mould or they are not heat-resistant. It should be noted, however, that the preferred conditions might vary for other manufacturing machines. However, the appropriate conditions of temperature and pressure etc. can readily be determined by simple experiment. When the conditions are correct, differential scanning calorimetry will show two peaks, rather than one, in the stereocomplex melting range.

By carrying out the injection moulding under these conditions, it is possible to mould articles from the stereocomplex having much improved dimensional stability at high temperatures, e.g. above 80° C.

The invention is further illustrated by the following non-limiting Examples.

EXAMPLE 1

Preparation Example

Preparation of 50/50 Stereoblends

Stereocomplexes were made by blending poly(L,L-lactide) (L-PLA) and poly(D,D-lactide) (D-PLA) at a 50/50 ratio, and cups were injection moulded from the degassed complex. The L-PLA and D-PLA were blended using a Brabender DSE 25 twin-screw extruder.

The residual lactide (r.l.) content was determined by proton NMR. Spectra were recorded on a 400 MHz Broker in $CDCl_3$. The r.l. content corresponded to the integral of the lactide methine relative to the methine signal of the polymer.

The L/D ratio of the polymer was determined by a HPLC equipped with a chiral column after hydrolysis of the PLA into lactic acid.

Molar masses were determined with a VISCOTEK TriSEC size exclusion chromatograph equipped with two PL gel Mixed C columns and a PL gel Guard column, and with RI and viscometer detectors. The samples (ca. 2.5-3 mg/mil; filtered through a 0.45 micron filter) were analysed at 30° C. in chloroform at a flow rate of 1 ml/min. Polystyrene standards were used to generate a universal calibration.

Differential Scanning Calorimetry-analyses were made using a Perkin-Elmer DSC-7. First heating was made at 10° C./min from 20° C. to 250° C. Then the sample was cooled back to 20° C. at 10° C./min. Second heating was also made at 10° C./min from 20° C. to 250° C. In the Figures, the graph from the first heating is in on top, cooling is in the middle, and the second heating is on the bottom.

Data from the analysis of the D- and L-PLA is presented in Table 1.

TABLE 1

Characterization results of the polylactides used in the blending.

|  | L-PLA | D-PLA |
| --- | --- | --- |
| Batch | 0506091145 | Degassed batch w-41-06 |
| Residual lactide | 0.55% | 0.7% |
| L/D-ratio | — | 0.5/99.5% |
| Mn | — | 93000 Da |
| Mw | 112000 | 195000 Da |
| Pd | — | 2.1 |
| Tg | 65° C. | 50° C. |
| Tm | 160° C. | 174° C. |

L-PLA and D-PLA granulates were mixed together and poured into the hopper of the extruder. The temperature profile setting of the extruder was as follows:

| HZ1 | HZ2 | HZ3 | HZ4 | HZ5 | HZ6 | HZ7 | HZ8 | HZ9 | HZ10 |
| --- | --- | --- | --- | --- | --- | --- | --- | --- | --- |
| 190° C. | 190° C. | 200° C. | 200° C. | 205° C. | 190° C. | 190° C. | 200° C. | 200° C. | 210° C. |

The feed of the hopper was set to about 4 kg/hour (13-16 rpm) and the output used was approximately 4.5 kg/h. During the extrusion blending, the torque of the extruder was 200-250 Nm. The extruded strand was cooled in a water bath and pelletised. The pellets were placed into a dryer at 50° C. for at least 24 h prior to further use.

The DSC scan of the stereocomplex blend granulates is shown in FIG. 1, where the bimodal melting peak is absent. The stereocomplex melting peak is at about 212° C. In addition, the melting peaks of L- and D-PLA can be seen at about 154° C. and 171° C., respectively.

EXAMPLE 2

Comparative Example

Injection Moulding of Cups with a Cone Temperature of 80° C.

Cups were injection moulded using an ARBURG-injection moulding machine. Different temperatures of the cone were tested together with different cooling times in order to optimize the injection moulding conditions. In addition, the cavity temperature was adjusted. If the cavity temperature was set to 45° C., for example, the cavity still felt cold. The cavity temperature was set by changing the T821-value in the Arburg temperature control panel. During the injection moulding, the injection pressure was approximately 1300 bar, after-pressure 1000 bar and holding-pressure 900 bar.

XRD-measurements were performed with a Philips X-pert X-ray diffractometer operating at 40 kV and 30 mA (Cu Kα radiation) at 25° C. within a 2θ range of 10-40° with a step of 0.02°. DSC measurements for the injection moulded cups were performed according to the method described in Example 1.

A series of experiments was done where the cone temperature was 80° C. and the cavity temperature was 20° C. Cooling times in the range of 1-45 seconds were tested. The result was a cup, which was soft and difficult to remove from the mould regardless of the cooling time applied. The PLA cup was amorphous according to XRD-measurements. The DSC traces for the cups showed a single stereocomplex melting peak in the range 210-230° C. (similar to FIG. 1).

EXAMPLE 3

Comparative Example

Injection Moulding of Cups with a Cone Temperature of 90° C.

Injection moulding of cups was performed according to settings specified in Example 2 except for the cone temperature, which was changed to 90° C. This resulted also in a soft cup, even though cooling time was varied between 1-45 seconds. The PLA cup was amorphous according to XRD-measurements. The DSC traces for the cups showed a single stereocomplex melting peak in the range 210-230° C. (similar to FIG. 1).

EXAMPLE 4

Comparative Example

Injection Moulding of Cups with a Cone Temperature of 75° C.

Cups were injection moulded according to settings specified in Example 2 except for the cone temperature, which was changed to 75° C. The result was a slightly better cup, i.e. easier to release from the mould, but it was still deformed. The cooling time did not make much of a difference to the results. The PLA cup was amorphous according to XRD-measurements. The DSC traces for the cups showed a single stereo-complex melting peak in the range 210-230° C. (similar to FIG. 1).

EXAMPLE 5

Comparative Example

Injection Moulding of Cups with a Cone Temperature of 70° C. with Rapid Cooling

Cups were injection moulded according to settings specified in Example 2 except for the cone temperature, which was changed to 70° C. The release from the mould was a lot easier. Different cooling times also seemed to have an impact. In this Example, the PLA was injected into the mould and the mould was kept closed for about 45 seconds. This resulted in relatively rapid cooling, less crystallization and accordingly a more amorphous material. When hot (85° C.) water was poured into this kind of cup, it became soft and did not hold its shape. The PLA cup was amorphous according to XRD-measurements. The DSC traces for the cups showed a single stereocomplex melting peak in the range 210-230° C. (similar to FIG. 1) in addition to a small melting peak for the D-PLA.

EXAMPLE 6

Injection Moulding of Cups with a Cone Temperature of 70° C. with Heated Cavity

Figure 3:
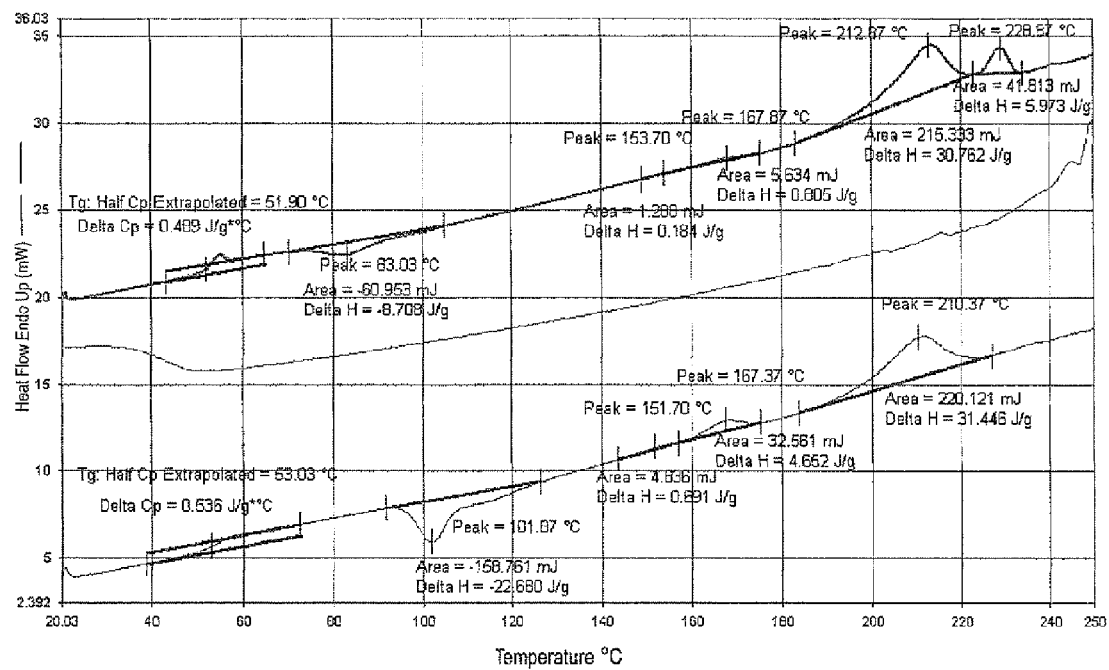
FIG. 3 shows DSC scans for injection moulded stereocomplex PLA cups using a cone temperature of 70° C. and slow cooling, as prepared in Example 6.

Some experiments were done when the cavity temperature was raised, using the same injection moulding machine as in Example 2. During moulding, the cone temperature was 70° C. and, the cavity temperature was 40° C. PLA was injected into the mould and the mould was kept closed for 30 seconds. The release was extremely good and the cup was heat resistant when the cavity temperature was kept in the range of 35-45° C. When hot water was poured into these cups, they kept their shape very well, despite some softening. In addition, it was possible to boil vegetable oil in this cup. XRD-measurements proved that the injection moulded material was crystalline and that the crystalline domains are D-PLA/L-PLA stereocomplex crystals. The DSC scan of the cups showed a bimodal melting enthalpy at temperatures around 230° C. during the first heating cycle, as shown in FIG. 3.

EXAMPLE 7

Figure 2:
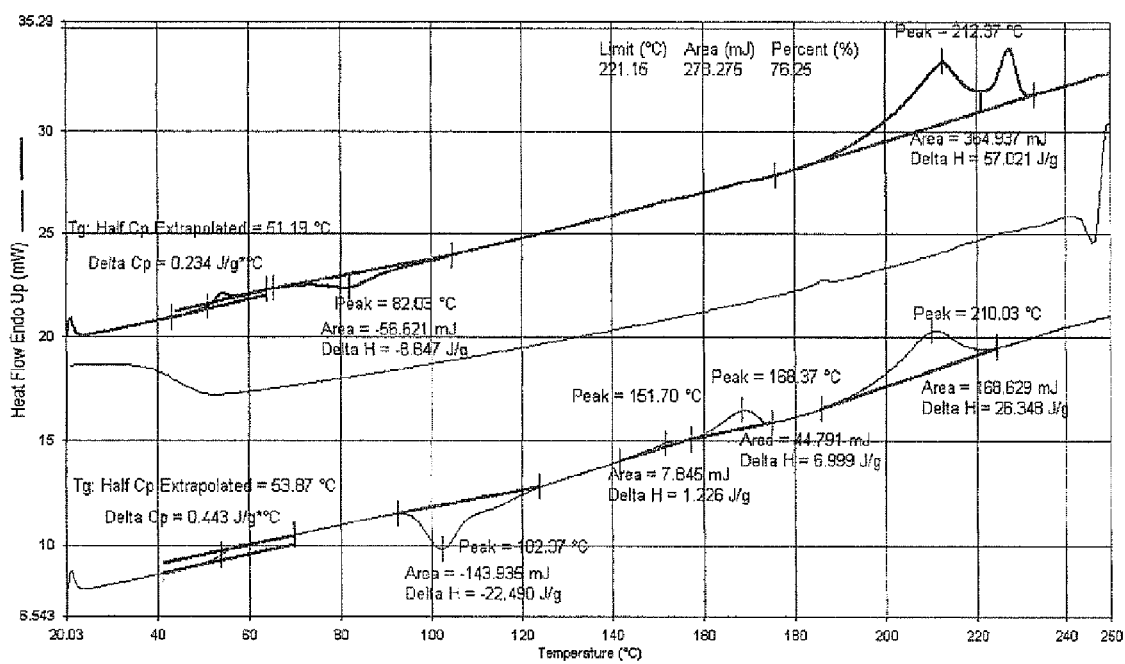
FIG. 2 shows the results of differential scanning calorimetry of the product of Example 7.

Injection Moulding of Cups with a Cone Temperature of 70° C. with Optimized Moulding Conditions Additional experiments were done when the moulding conditions were optimized. During moulding, the cone temperature was 70° C. and the cavity temperature was 20° C. The polymer blend was injected into the mould and the mould was kept closed for 10 seconds, after which it was opened and the cup was kept on the hot cone (70° C.) for another 10 seconds before releasing it from the cone. This resulted in improved crystallisation and the DSC measurements proved that an even more emphasized stereocomplexation at around 230° C. took place, as shown in FIG. 2.

When hot water was poured into a cup manufactured in this way, it also held its shape very well and it was possible to boil vegetable oil in the cup.

EXAMPLE 8

Comparative Example

Injection Moulding of Cups with a Cone Temperature of 65° C.

Injection moulding of cups was performed according to the settings specified in Example 2 except for the cone temperature, which was changed to 65° C. The result was that the cup became too hard and broke on release from the mould.

The invention claimed is:

1. A stereocomplex of poly(D-lactic acid) and poly(L-lactic acid) formed by injection moulding which, on differential scanning calorimetry, exhibits two peaks within the melting range of the stereocomplex.

2. A stereocomplex according to claim 1, which, on differential scanning calorimetry, exhibits two peaks within the melting range of 190 to 240° C.

3. A stereocomplex according to claim 1, which, on differential scanning calorimetry, exhibits two peaks within the melting range of 200 to 240° C.

4. A stereocomplex according to claim 1, in which the average molecular weight $M_v$ of one or both of the D- and L-poly(lactic acids) is in excess of $6 \times 10^4$ g/mol.

5. A stereocomplex according to claim 4, in which the average molecular weight $M_v$ of each of the D- and L-poly(lactic acids) is in excess of $6 \times 10^4$ g/mol.

6. A stereocomplex according to claim 4 or claim 5, in which the average molecular weight $M_v$ is at least $6.5 \times 10^4$ g/mol.

7. A process for producing a stereocomplex according to claim 1, which comprises injection moulding a blend of poly (D-lactic acid) and poly(L-lactic acid) under conditions of temperature and pressure such that the resulting stereocomplex exhibits two peaks within the stereocomplex melting range on differential scanning calorimetry.

8. A stereocomplex according to claim 6, in which the average molecular weight $M_v$ is at least $7 \times 10^4$ g/mol.

9. An article, wherein the article is molded from a stereocomplex of poly(D-lactic acid) and poly(L-lactic acid) which, on differential scanning calorimetry, exhibits two peaks within the melting range of the stereocomplex, and wherein the article is crystalline and its crystalline domains are poly (D-lactic acid) and poly(L-lactic acid) stereocomplex crystals.

10. The article of claim 9, wherein the stereocomplex, on differential scanning calorimetry, exhibits two peaks within the melting range of 190 to 240° C.

11. The article of claim 9, wherein the stereocomplex, on differential scanning calorimetry, exhibits two peaks within the melting range of 200 to 240° C.

12. The article of claim 9, wherein the stereocomplex has an average molecular weight $M_v$ of one or both of the D- and L-poly(lactic acids) in excess of $6 \times 10^4$ g/mol.

13. The article of claim 12, wherein the average molecular weight $M_v$ of each of the D- and L-poly(lactic acids) is in excess of $6 \times 10^4$ g/mol.

14. The article of claim 13, wherein the average molecular weight $M_v$ is at least $6.5 \times 10^4$ g/mol.

15. The article of claim 14, wherein the average molecular weight $M_v$ is at least $7 \times 10^4$ g/mol.

16. The process of claim 7, in which the injection molding is performed at conditions of injection pressure 1250±250 bar; after-pressure and holding-pressure 1000±200 bar; cone temperature 70±3° C.; cavity temperature 40±5° C.; and cooling time 30±5 seconds, when performed using an Arburg Allrounder™ 320C injection molding machine; or comparable conditions on another injection molding machine.

17. The stereocomplex of claim 1, wherein the molecular weight of the poly(D-lactic acid) is about 74.1% greater than the molecular weight of the poly(L-lactic acid).

* * * * *